United States Patent
Yoshida et al.

(10) Patent No.: US 7,927,019 B2
(45) Date of Patent: Apr. 19, 2011

(54) SLEWING BEARING STRUCTURE

(75) Inventors: Takafumi Yoshida, Nagasaki (JP);
Katsuhiko Takita, Nagasaki (JP); Hisao Miyake, Nagasaki (JP); Masaaki Shibata, Nagasaki (JP); Keita Nakashima, Nagasaki (JP)

(73) Assignee: Mitsubishi Heavy Industries Ltd., Tokyo (JP)

( * ) Notice: Subject to any disclaimer, the term of this patent is extended or adjusted under 35 U.S.C. 154(b) by 596 days.

(21) Appl. No.: 11/916,106

(22) PCT Filed: May 31, 2005

(86) PCT No.: PCT/JP2005/009993
§ 371 (c)(1),
(2), (4) Date: Feb. 12, 2008

(87) PCT Pub. No.: WO2006/129351
PCT Pub. Date: Dec. 7, 2006

(65) Prior Publication Data
US 2009/0016665 A1   Jan. 15, 2009

(51) Int. Cl.
*F16C 33/56* (2006.01)
*F16C 19/08* (2006.01)

(52) U.S. Cl. .................... 384/512; 384/515

(58) Field of Classification Search .......... 384/490, 384/499–506, 512, 513, 515
See application file for complete search history.

(56) References Cited

U.S. PATENT DOCUMENTS

| | | | |
|---|---|---|---|
| 4,668,109 A * | 5/1987 | Basso | 384/518 |
| 4,673,302 A | 6/1987 | LaRou | |
| 4,790,722 A | 12/1988 | Herrmann | |
| 5,325,586 A | 7/1994 | Andersson | |
| 5,547,291 A * | 8/1996 | Miyazaki et al. | 384/512 |
| 6,010,247 A | 1/2000 | Mouri et al. | |
| 6,102,575 A | 8/2000 | Obara | |
| 2002/0097935 A1* | 7/2002 | Beckers et al. | 384/490 |
| 2003/0106384 A1 | 6/2003 | Yokota et al. | |
| 2004/0136629 A1 | 7/2004 | Mori et al. | |

FOREIGN PATENT DOCUMENTS

| | | |
|---|---|---|
| DE | 9202230.8 | 4/1992 |
| DE | 4142313 A1 | 6/1993 |
| FR | 2580348 A1 | 10/1986 |

(Continued)

OTHER PUBLICATIONS

CA Search Report for 2,610,407 mailed Dec. 7, 2009.

(Continued)

*Primary Examiner* — Thomas R Hannon
(74) *Attorney, Agent, or Firm* — Lowe Hauptman Ham & Berner LLP

(57) ABSTRACT

A slewing bearing includes: an outer ring section having first and second circumferential grooves formed on an inner circumferential surface in parallel; an inner ring section formed on an inner side of the outer ring section and having first and second circumferential grooves formed on an outer circumferential surface in parallel in correspondence to the first and second circumferential grooves of the outer ring section; a first row of rolling elements provided in the first circumferential groove of the outer ring section and the first circumferential groove of the inner ring section; and a second row of rolling element provided in the second circumferential groove of the outer ring section and the second circumferential groove of the inner ring section. The inner ring section rotates via the first and second rolling element rows around a rotation axis in a relatively opposite direction to the outer ring section.

11 Claims, 15 Drawing Sheets

FOREIGN PATENT DOCUMENTS

| | | |
|---|---|---|
| FR | 2802990 A1 | 6/2001 |
| JP | 53-97701 U | 8/1978 |
| JP | 61171917 A | 8/1986 |
| JP | 4027216 U | 3/1992 |
| JP | 6-8857 U | 2/1994 |
| JP | 7-310645 A | 11/1995 |
| JP | 10-318255 A | 12/1998 |
| JP | 2002-13540 A | 1/2002 |
| JP | 2002-98136 A | 4/2002 |
| JP | 2003172345 A | 6/2003 |
| JP | 2003-294033 A | 10/2003 |
| JP | 2004-150472 A | 5/2004 |
| JP | 2005-147331 A | 6/2005 |
| WO | 93/17251 A1 | 9/1993 |

OTHER PUBLICATIONS

ISR for PCT/JP2005/009993 mailed Nov. 22, 2005.

Mexican OA for MX/a/2007/015178, mailed Nov. 10, 2009.

\* cited by examiner

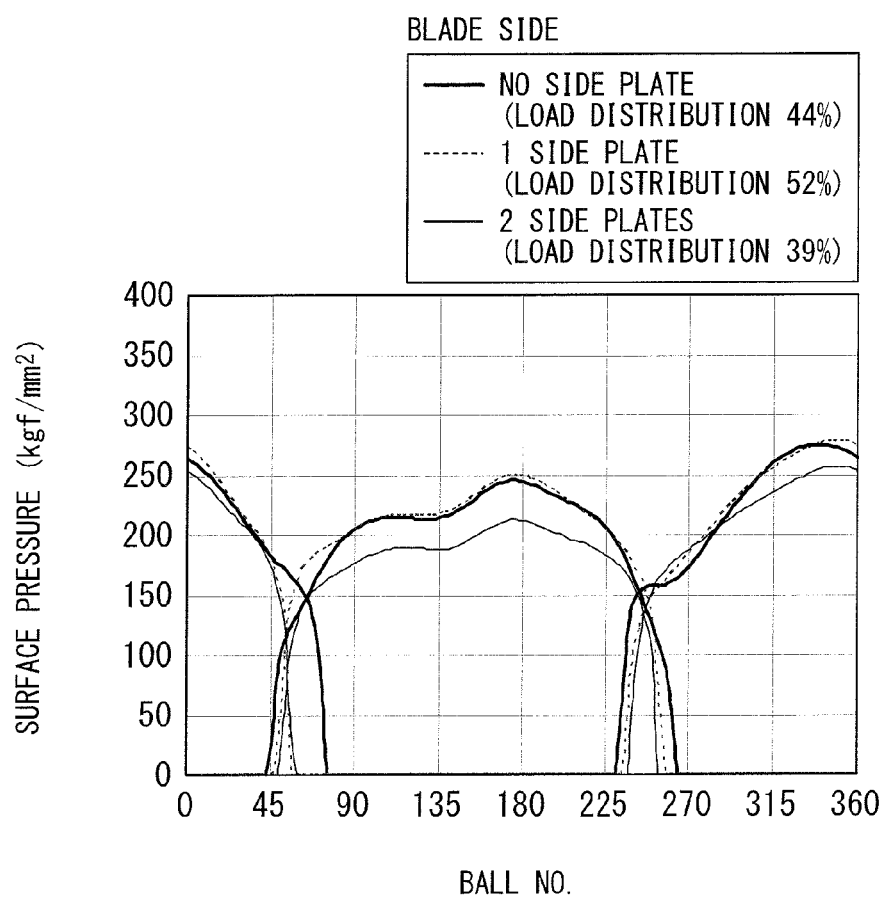

SLEWING BEARING STRUCTURE

RELATED APPLICATIONS

The present application is based on, and claims priority from, International Application Number PCT/JP2005/009993, filed May 31, 2005, the disclosure of which is hereby incorporated by reference herein in its entirety.

TECHNICAL FIELD

The present invention relates to a slewing bearing structure, and more particularly, to a double-row slewing bearing.

BACKGROUND ART

For global environmental conservation, it has been desired to use natural energy with a low impact on the environment. As one of natural energy, wind energy is promising. A wind turbine is a rotary machine that converts wind energy into electric energy. As shown in FIG. 1, the wind turbine is composed of a support tower 101, a wind turbine base 102 turnably supported by the support tower, and a wind turbine rotor (rotor head) 103 rotatably supported to the windmill base 102. A plurality of blades (three blades in this example) 104A, 104B, and 104C are turnably supported to the rotor head 103 via slewing bearings 105A, 105B, and 105C (in such a manner that the pitch can be varied), respectively. As shown in FIG. 2, the slewing bearing 105B is composed of a non-rotary outer ring 106 on a rotor head side and a rotary inner ring 107 on a blade side. An annular rolling element row 108 is provided between the outer ring 106 and the inner ring 107. A rolling element as an element of the rolling element row 108 has a shape of a rolling ball or a rolling roller with a substantially cylindrical surface or a spherical surface.

On the slewing bearing 105B supporting the blade 104B as one of the three blades shown in FIG. 1 act an external force Fxb in a radial direction XB; a rotation moment Mxb around the direction XB; an external force Fyb in a radial direction YB; a rotation moment Myb around the direction YB; an external force Fzb in an axial direction ZB orthogonal to the rotation axis of the rotor head 103; and a rotation moment Mzb around the axial direction ZB. Such three-dimensional forces generate a surface pressure against the outer ring 106, the inner ring 107, and a large number of rolling elements included in the rolling element row 108. Such surface pressure acts as an elastic deforming force on the outer ring 106, the inner ring 107, and the rolling element row 108. Such a deforming force is expressed as a distribution function of the circumferential positions corresponding to an element number of each of a large number of rolling elements arranged on the same circumference, and element load imposed on the rolling elements or surface pressure at this position is not constant but greatly variable. Such a deforming force appears as a cause of large friction generated at the slewing bearings 105A, 105B, and 105C, shortening the life of the slewing bearing.

In conjunction with the above description, Japanese Laid Open Patent application (JP-P2002-13540A) discloses a double-row slewing bearing. In this conventional example, an insertion hole is provided for an outer ring or an inner ring in a radial direction and rolling elements are inserted from the insertion hole. This conventional example describes that an amount of pre-load increases gradually as the rollers are inserted, but does not describe the amount of pre-load for each row.

In addition, Japanese Laid Open Patent application (JP-A-Heisei 7-310645) discloses a windmill blade. In this conventional example, a blade section is supported by a rotor head via a slewing bearing in such a manner that the pitch can be varied, and the slewing bearing supports radial load and thrust load at the same time. This slewing bearing is a single-row bearing.

DISCLOSURE OF INVENTION

An object of the present invention is to provide a slewing bearing that achieves a double-row structure and uniform surface pressure in the slewing bearing (rolling element load equalization) at the same time.

Another object of the present invention is to provide a slewing bearing that achieves a double-row structure and surface pressure equalization in the slewing bearing through appropriate equal rolling element load distribution.

Still another object of the present invention is to provide a slewing bearing that achieves a double-row structure and achieves surface pressure equalization in case of unequal load distribution.

Still another object of the present invention if to provide a wind turbine using the above slewing bearing.

In an aspect of the present invention, a slewing bearing includes: an outer ring section having first and second circumferential grooves formed on an inner circumferential surface in parallel; an inner ring section formed on an inner side of the outer ring section and having first and second circumferential grooves formed on an outer circumferential surface in parallel in correspondence to the first and second circumferential grooves of the outer ring section; a first row of rolling elements provided in the first circumferential groove of the outer ring section and the first circumferential groove of the inner ring section; and a second row of rolling element provided in the second circumferential groove of the outer ring section and the second circumferential groove of the inner ring section. The inner ring section rotates via the first and second rolling element rows around a rotation axis in a relatively opposite direction to the outer ring section. When a load to the first rolling element row is larger than a load to the second rolling element row, a first pre-load on the rolling elements of the first rolling element row is larger than a second pre-load on the rolling elements of the second rolling element row.

Here, it is preferable that the first pre-load on the rolling elements of the first rolling element row corresponding to a first outer circumferential section is larger than the second pre-load on the rolling elements of the second rolling element row corresponding to a second outer circumferential section.

In this case, a radial thickness of the first outer circumferential section of the outer ring section may be thicker than that of the second outer circumferential section of the outer ring section. Moreover, a first radial diameter of the rolling elements of the first rolling element row may be smaller than a second radial diameter of the rolling elements of the second rolling element row.

A width of the outer ring section in a rotation axis direction may be equal to that of the inner ring section in the rotation axis direction, or the width of the outer ring section in the rotation axis direction may be wider than that of the inner ring section in the rotation axis direction.

When the width of the outer ring section in the rotation axis direction is wider than that of the inner ring section in the rotation axis direction, the outer ring section may further include a side plate coupled to a surface of the outer ring section orthogonal to the rotation axis direction. In addition, the inner ring section may further include a side plate coupled to a surface of the outer ring section orthogonal to the rotation axis direction.

The rolling elements of the first and second rolling element rows may be balls or rollers.

In another aspect of the present invention, a wind power generator includes: a rotor head connected to a wind force output rotation axis; a plurality of blades; and the slewing bearing so provided as to couple the plurality of blades to the rotor head.

BRIEF DESCRIPTION OF DRAWINGS

FIG. 18 is a graph showing still another surface pressure distribution in the slewing bearing structure of the wind turbine according to the present invention.

BEST MODE FOR CARRYING OUT THE INVENTION

Hereinafter, a slewing bearing of the present invention will be described in detail with reference to the attached drawings. Although the following description is given to a slewing bearing for a wind turbine, it would be apparent to those skilled in the art that the present invention is applicable to a general type of slewing bearing.

Figure 1:
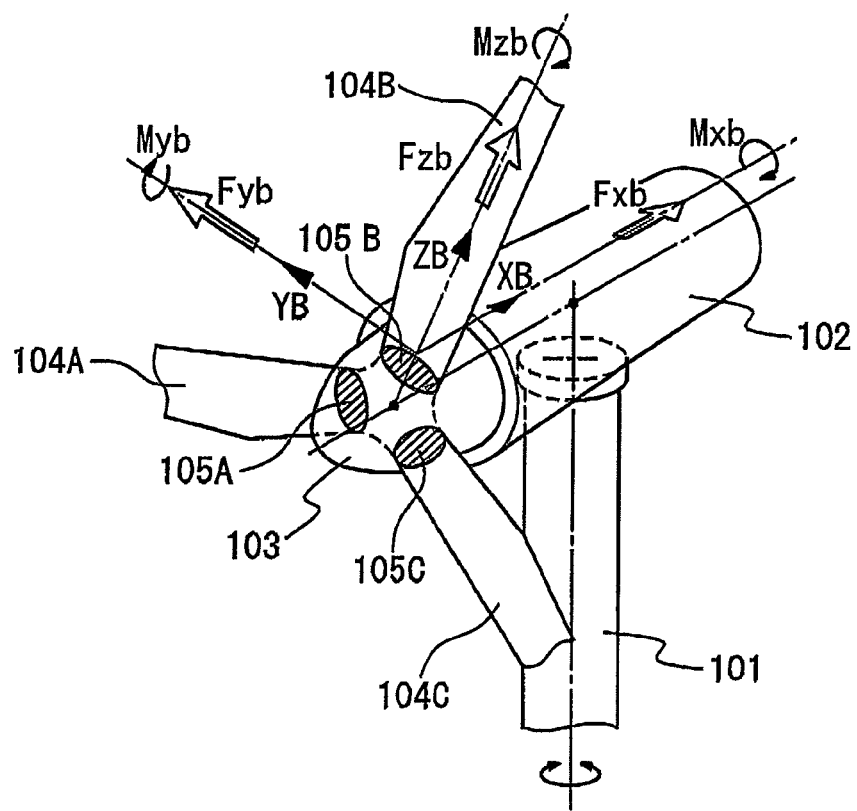
FIG. 1 is a perspective view showing a conventional wind turbine structure.
Figure 2:
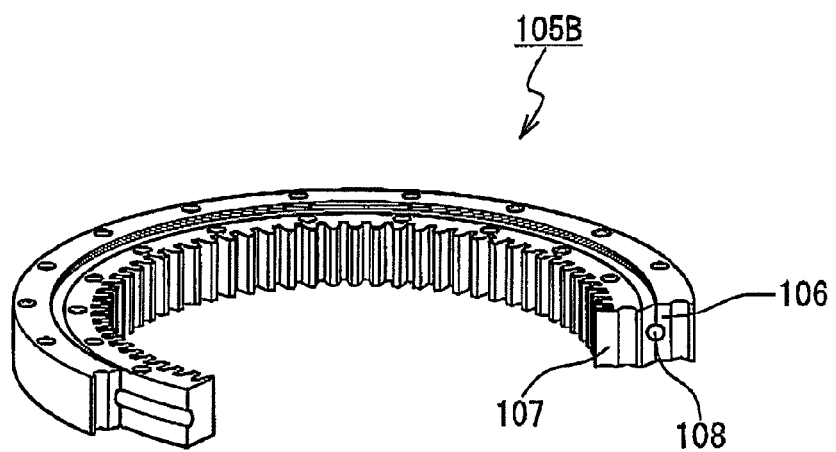
FIG. 2 is a perspective view showing a conventional slewing bearing.
Figure 3:
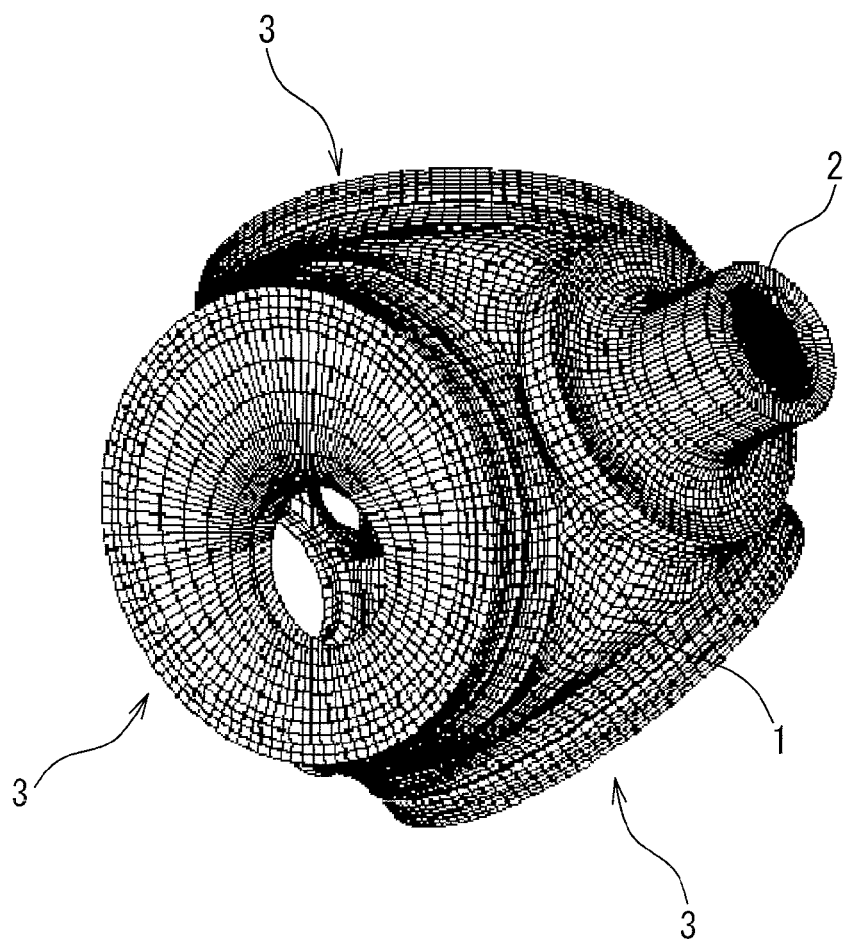
FIG. 3 is a perspective view showing a slewing bearing structure to which the present invention is applied.

FIG. 3 is a perspective view showing a slewing bearing structure for a wind turbine according to a first embodiment of the present invention. Referring to FIG. 3, a wind power extracting rotary shaft 2 and three sets of slewing bearings 3 are provided to a wind turbine rotor (rotor head) 1. Three variable pitch blades (not shown) are respectively supported by the three sets of slewing bearings 3. The rotation axes of the respective three sets of slewing bearings 3 are arranged on a same plane at the same angular interval of 120 degrees.

Figure 4:
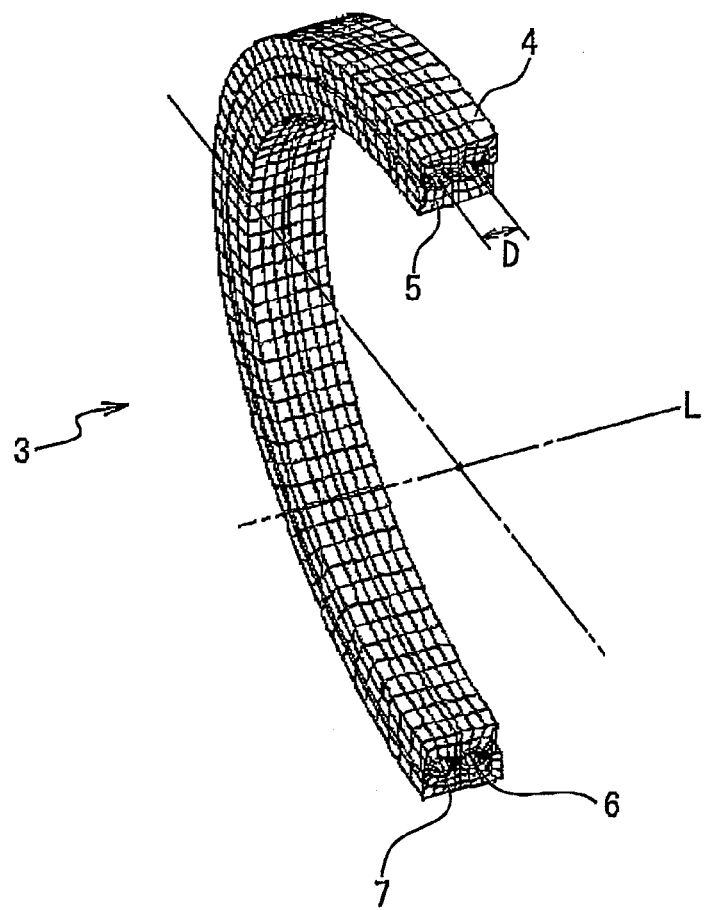
FIG. 4 is a partial perspective sectional view of FIG. 3.

Referring to FIG. 4, the slewing bearing 3 is composed of an outer ring 4 firmly fixed to the rotor head 1 and an inner ring 5 firmly fixed to the blade. A first rolling element row 6 and a second rolling element row 7 are provided between an inner circumference surface of the outer ring 4 and an outer circumferential surface of the inner ring 5. Each of rolling elements of the first rolling element row 6 and the second rolling element row 7 has a ball-like or roller-like shape. The first rolling element row 6 and the second rolling element row 7 are separated from each other by the interval D in a direction of a rotation axis L.

A FEM analysis is performed on a surface pressure generated on the surfaces of the outer ring 4 and the inner ring 5, and results of this analysis are drawn on these surfaces with lines. Retainers retaining the respective rolling elements of the first rolling element row 6 and the second rolling element row 7 are formed as a single unit or a unit unified with the outer ring 4 or the inner ring 5. As the rolling element in the first rolling element row 6 and the second rolling element row 7, a rolling ball or a spherical roller may be used.

Figure 5:
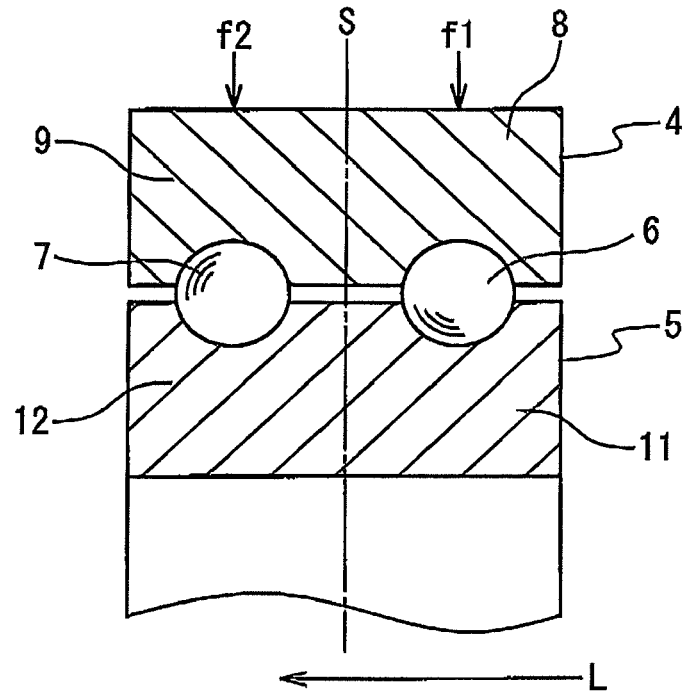
FIG. 5 is a sectional view showing a division region of the slewing bearing of the present invention.

FIG. 5 shows two regions where a load f1 and a load f2 are distributed in a rotation axis direction through equal load distribution or unequal load distribution, and the circumferential surface pressures are equalized (surface pressure difference distribution is flattened). Circumferential coordinates are expressed by use of element numbers assigned to the rolling element as a plurality of rolling elements arranged in line on the same circumference. Therefore, the circumferential coordinates are discretized. The outer ring 4 unitarily formed is virtually divided in the rotation axis direction into two sections: a first outer ring section 8 corresponding to the first rolling element row 6 and a second outer ring section 9 corresponding to the second rolling element row 7. The inner ring 5 integrally or unitarily formed is virtually divided in the rotation axis direction into two sections: a first inner ring section 11 corresponding to the first rolling element row 6 and a second inner ring section 12 corresponding to the second rolling element row 7. The first outer ring section 8 and the second outer ring section 9 are separated in the rotation axis direction by a virtual central plane S orthogonal to a rotation axis L. The first inner ring section 11 and the second inner ring section 12 are separated in the rotation axis direction by the virtual central plane S.

Figure 6:
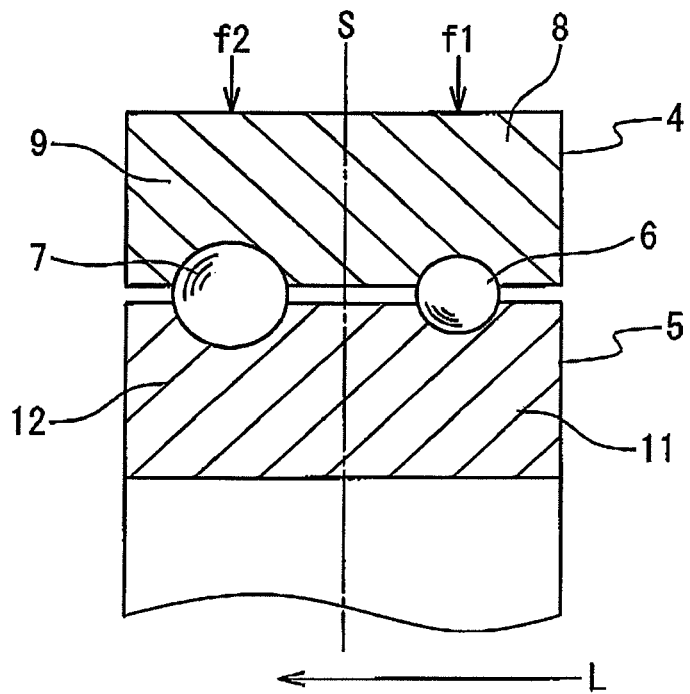
FIG. 6 is a sectional view showing a slewing bearing structure in a wind turbine according to an embodiment of the present invention.

FIG. 6 shows an example of load distribution with the slewing bearing structure of the wind turbine to which the present invention is applied. When a load f1 acting on an outer circumferential surface of the first outer ring section 8 is smaller than a load f2 acting on an outer circumferential surface of the second outer ring section 9, it is preferable that the diameter of the rolling element of the first rolling element row 6 is smaller than the diameter of the rolling element of the second rolling element row 7. Since a larger rolling element diameter provides a larger rolling element load capability, in this example, the degree of deformation or inner stress distribution of the first outer ring section 8 and the second outer ring section 9 can be equalized.

Figure 7:
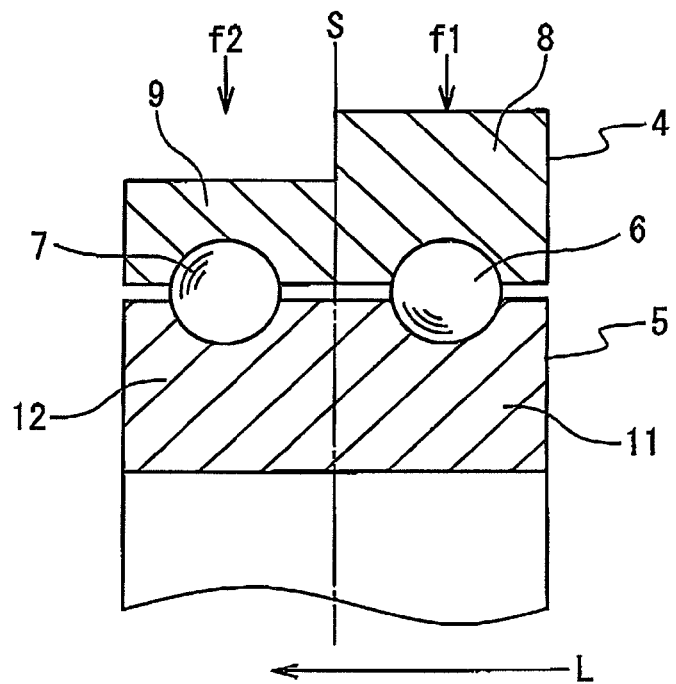
FIG. 7 is a sectional view showing the slewing bearing structure in the wind turbine according to another embodiment of the present invention.

FIG. 7 shows another example of load distribution in the slewing bearing structure for the wind turbine to which the present invention is applied. In this example, the first rolling element row 6 and the second rolling element row 7 have the same rolling element diameter. When the load f2 acting on the outer circumferential surface of the second outer ring section 9 is larger than the load f1 acting on the outer circumferential surface of the first outer ring section 8, the thickness of the first outer ring section 8 in a radial direction is made thicker than the radial thickness of the second outer ring section 9 so that a rigidity of the second outer ring section 9 becomes smaller than that of the first outer ring section 8. As a result, a larger load acts on the section with the larger rigidity, thus achieving equal load distribution to the first rolling element row 6 and the second rolling element row 7. The equal load distribution equalizes bearing surface pressures (surface pressure difference distribution). Such magnitude relation between the first outer ring section 8 and the second outer ring section 9 is generally appropriate. However, in practice, based on the results of the FEM analysis on an actual structure, its thickness, shape, and position of the virtual central plane S in the rotation axis direction are defined. In this example, an equal load distribution is achieved.

Figure 8:
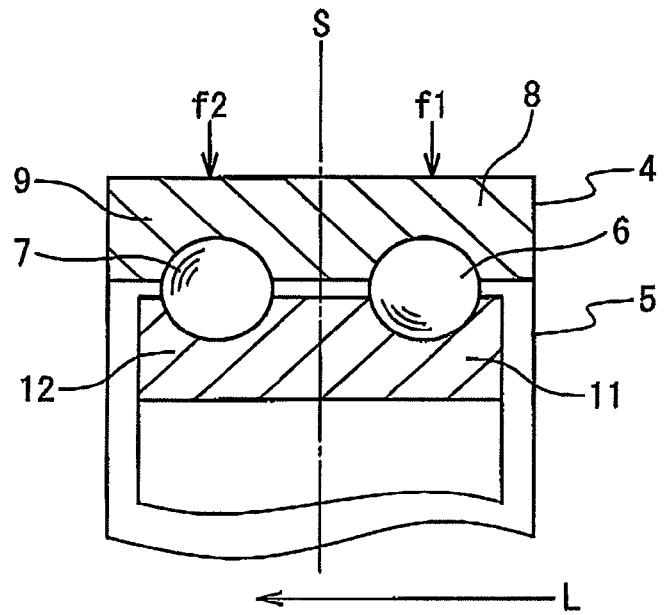
FIG. 8 is a sectional view showing the slewing bearing structure in the wind turbine according to still another embodiment of the present invention.

FIG. 8 shows still another example of the equal load distribution in the windmill slewing bearing structure to which the present invention is applied. This example is same to the embodiment of FIG. 7 in that the shape of outer ring 4 and the inner ring 5 are adjusted. In accordance with a magnitude relation between f1 and f2, the width in the rotation axis direction between the outer ring 4 and the inner ring 5 are defined. Alternatively, based on the magnitude relation between f1 and f2, the widths of the first outer ring section 8 and the second outer ring section 9 in the rotation axis direction and the widths of the first inner ring section 11 and the second inner ring section 12 in the rotation axis direction are defined. In this example, the equal load distribution is achieved.

Figure 9:
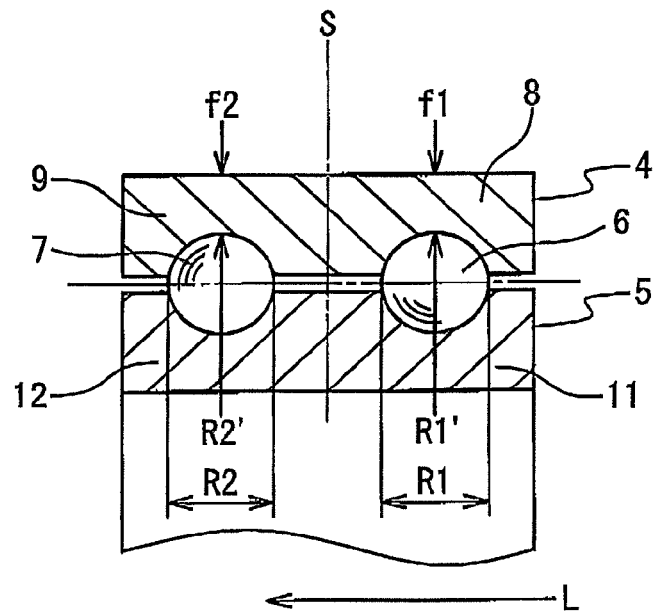
FIG. 9 is a sectional view showing the slewing bearing structure in the wind turbine according to still another embodiment of the present invention.

FIG. 9 shows still another example of equal load distribution in the slewing bearing structure for the wind turbine to which the present invention is applied. Based on the magnitude relation between f1 and f2, a small difference •R is provided between the element diameter R1 of the first rolling element row 6 and the element diameter R2 of the second rolling element row 7:

•R=R2−R1=K*(f2−f1), where K is a small constant value.

The first rolling element row 6 and the second rolling element row 7 are provided between the outer ring 4 and the inner ring 5. The first rolling element row 6 and the second rolling element row 7 are strongly sandwiched by the outer ring 4 and the inner ring 5. In this case, when the load f1 acting on the outer circumferential surface of the first outer ring section 8 is larger than the load f2 acting on the outer circumferential surface of the second outer ring section 9, the element 7 with a slightly larger diameter has a larger pre-load force and thus has a larger rigidity. As a result, more load acts on the element with the larger rigidity, thus the achieving equal load distribution to the first rolling element row 6 and the second rolling element row 7. In this example, through adjustment of the element diameters and the pre-load forces, the bearing surface pressure can be equalized, thus flattening the surface pressure difference distribution. According to the idea of pre-load adjustment in this example, although not shown, a slight difference can be provided between the diameter R1' of the outer ring in a first annular row 6 and the diameter R2' of the outer ring in a second annular row 7 to thereby equalize (flatten) the bearing surface pressure distribution between the both rows.

Figure 10:
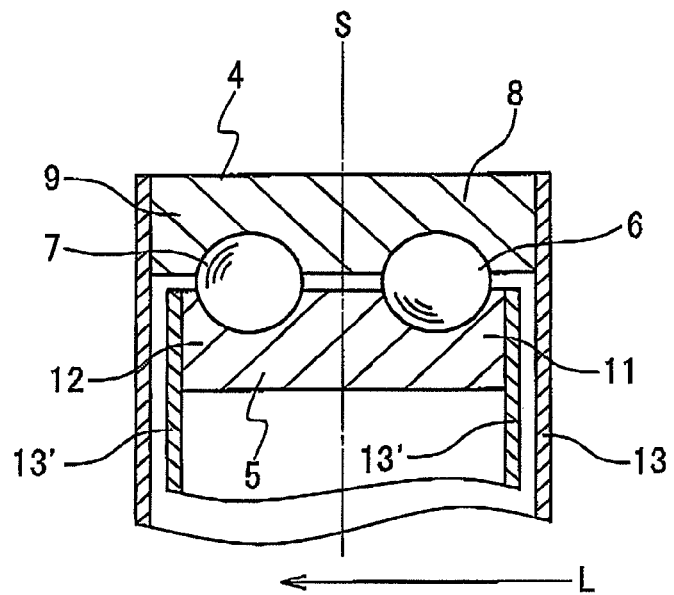
FIG. 10 is a sectional view showing the slewing bearing structure in the wind turbine according to still another embodiment of the present invention.

FIG. 10 shows still another example of the equal load distribution. A ring plate (side plate) 13 of a thickness determined based on the magnitude relation between f1 and f2 is fitted to a side circumferential surface of the first outer ring section 8, and a ring plate (side plate) 13 of a thickness determined based on the magnitude relation between f1 and f2 is fitted to the side circumferential surface of the second outer ring section 9. In addition, the ring plate 13' of the thickness determined based on the magnitude relation between f1 and f2 is fitted to the side circumferential surface of the first inner ring section 11, and the ring plate 13' of the thickness determined based on the magnitude relation between f1 and f2 is fitted to a side circumferential surface of the second inner ring section 12. Alternatively, the thickness of the ring plate 13 fitted to the first outer ring section 8 and the thickness of the ring plate 13' fitted to the first inner ring section 11 may be adjusted based on the magnitude relation between f1 and f2. Alternatively, the thickness of the ring plate 13 fitted to the second outer ring section 9 and the thickness of the ring plate 13' fitted to the second inner ring section 12 may be adjusted based on the magnitude relation between f1 and f2. The equal load distribution can be achieved by rigidity adjustment.

It should be noted that the ring plates described above may be provided only to the outer ring section 4 or to the inner ring section 5. Moreover, this ring plate may extend to the neighborhood of the rotation shaft coupled to the inner ring section 5 in such a manner as not to interfere with the rotation shaft.

Figure 11:
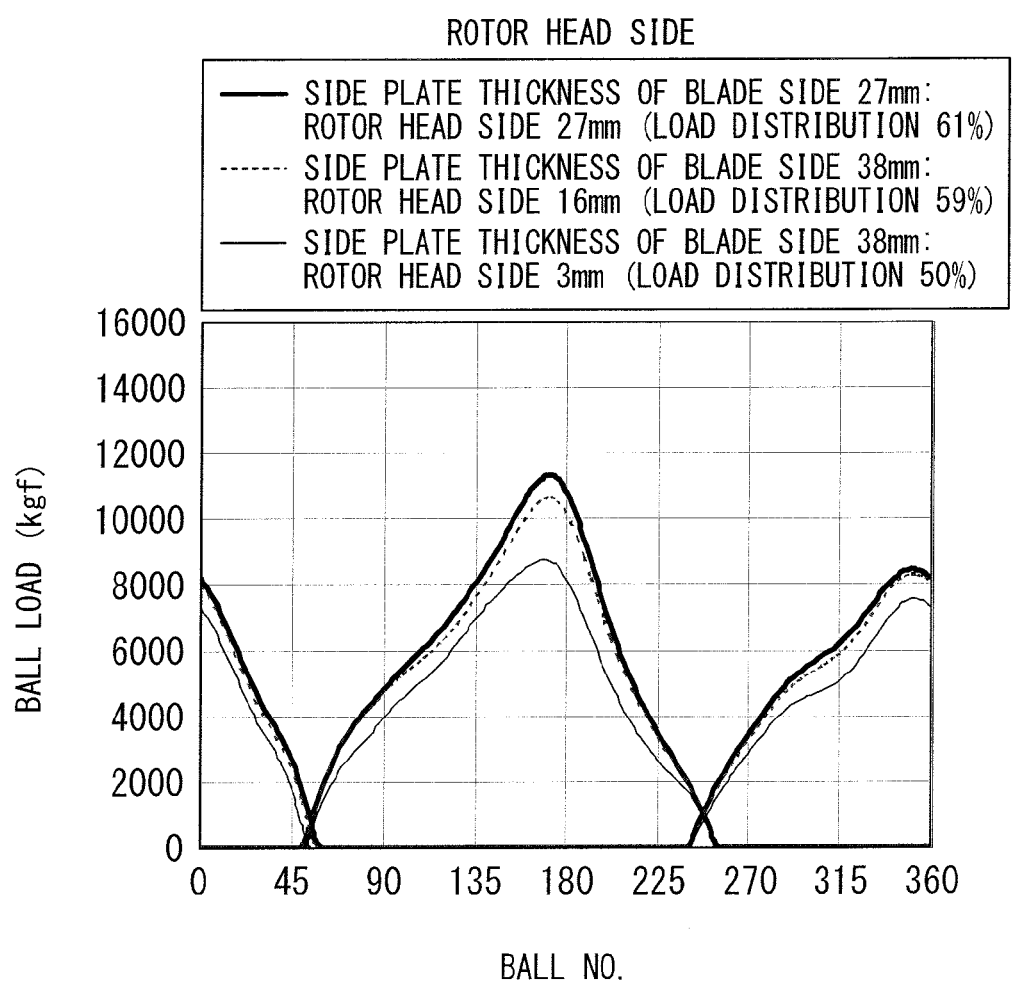
FIG. 11 is a graph showing an element load distribution in the slewing bearing structure of the wind turbine according to the present invention.
Figure 12:
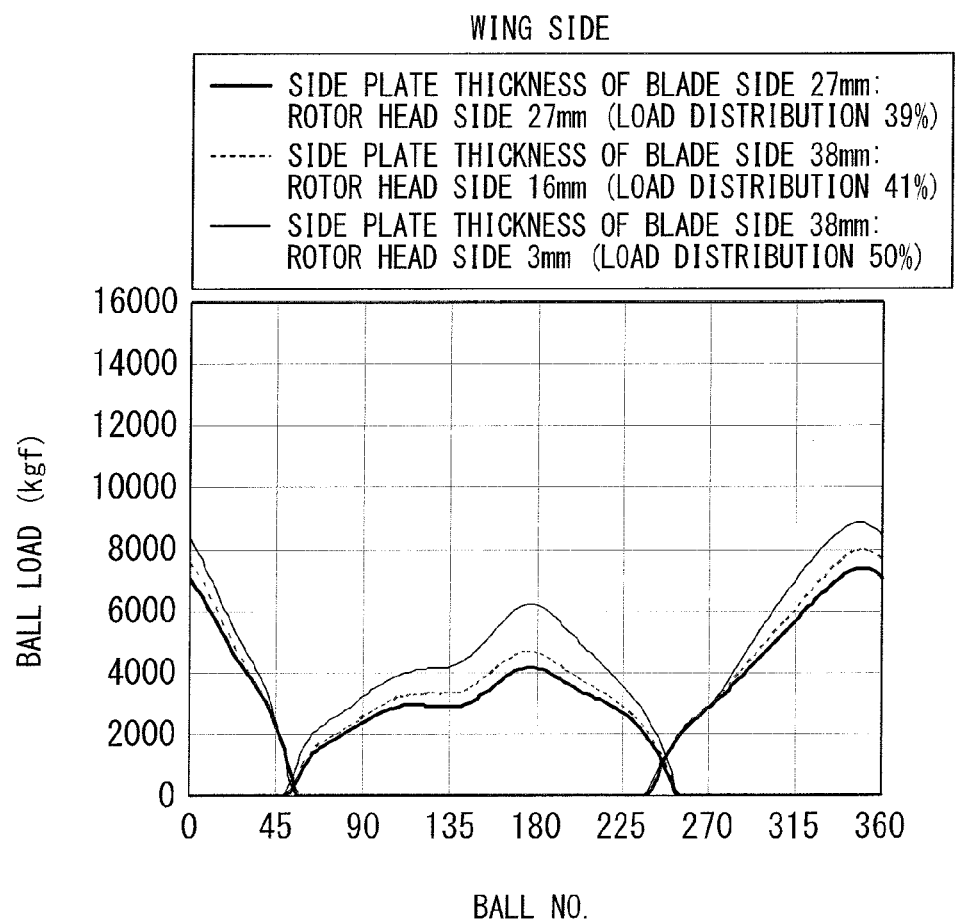
FIG. 12 is a graph showing another element load distribution in the slewing bearing structure of the wind turbine according to the present invention.
Figure 13:
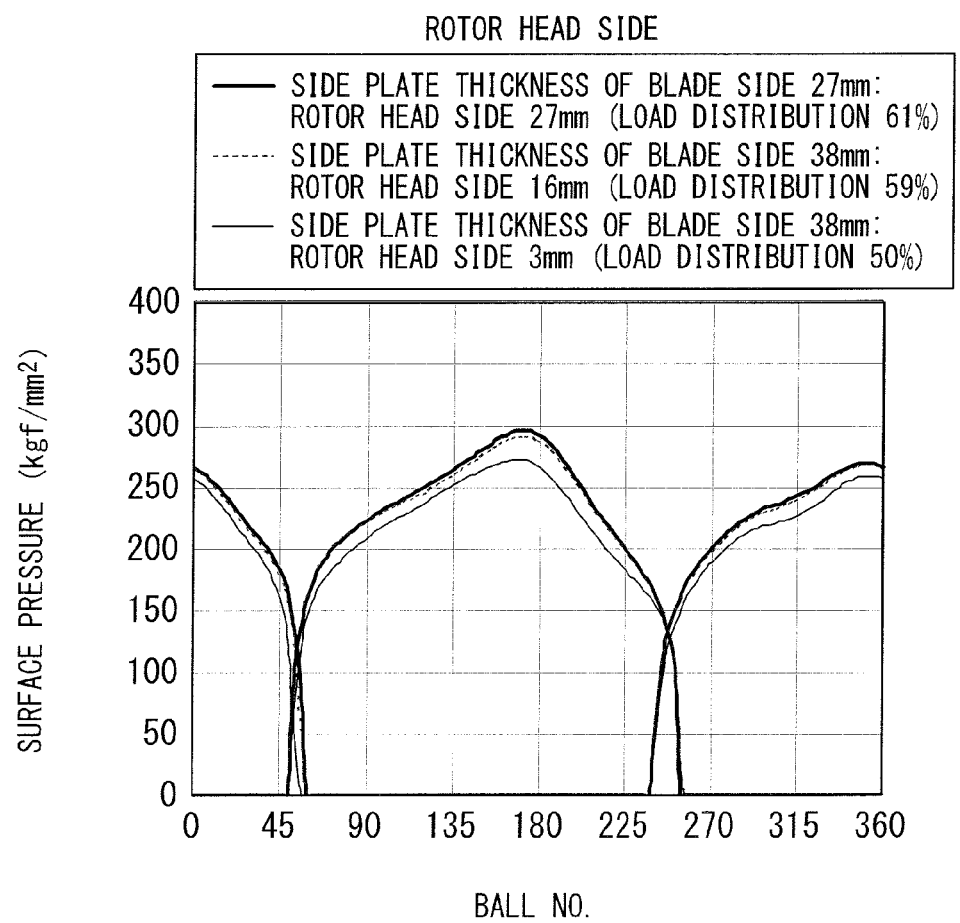
FIG. 13 is a graph showing a surface pressure distribution in the slewing bearing structure of the wind turbine according to the present invention.
Figure 14:
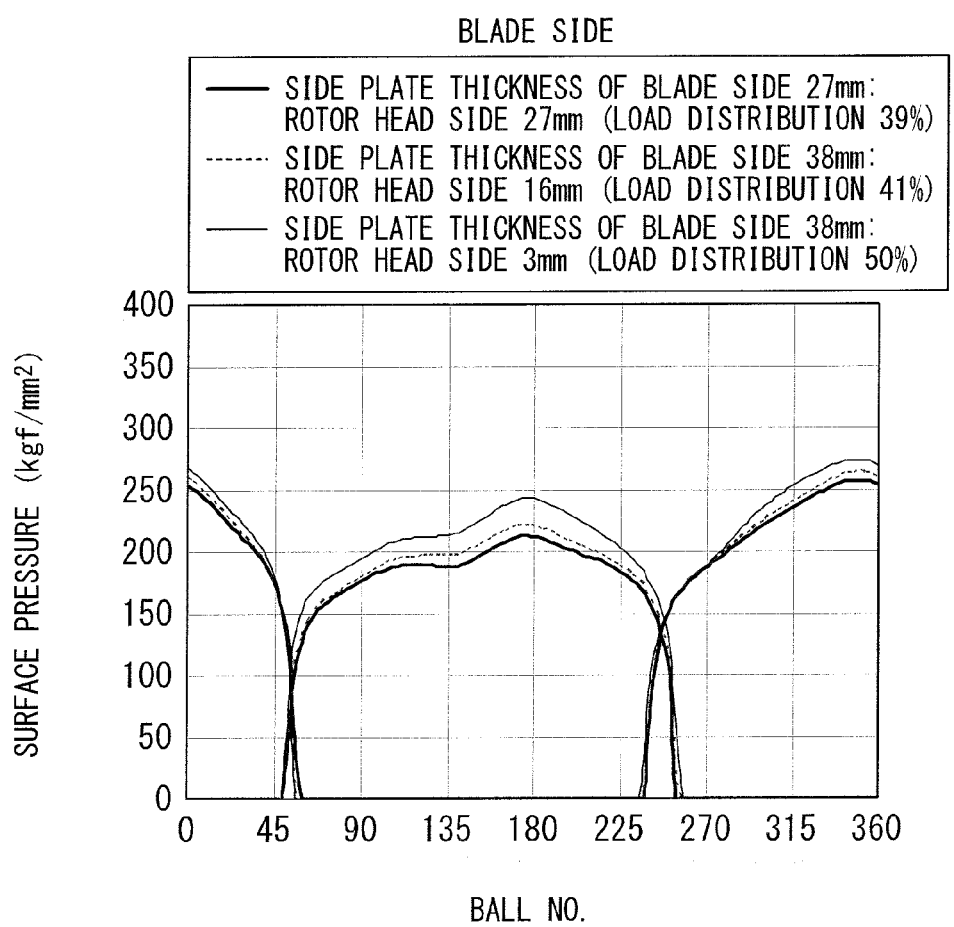
FIG. 14 is a graph showing another surface pressure distribution in the slewing bearing structure of the wind turbine according to the present invention.
Figure 15:
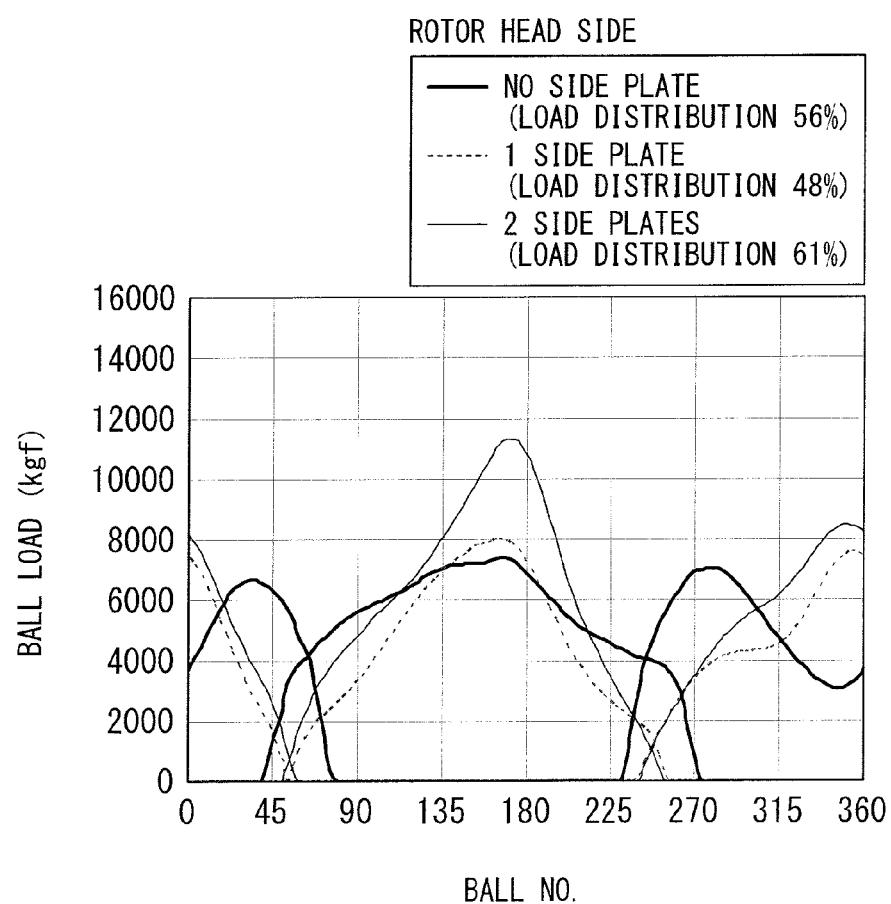
FIG. 15 is a graph showing still another element load distribution in the slewing bearing structure of the wind turbine according to the present invention.
Figure 16:
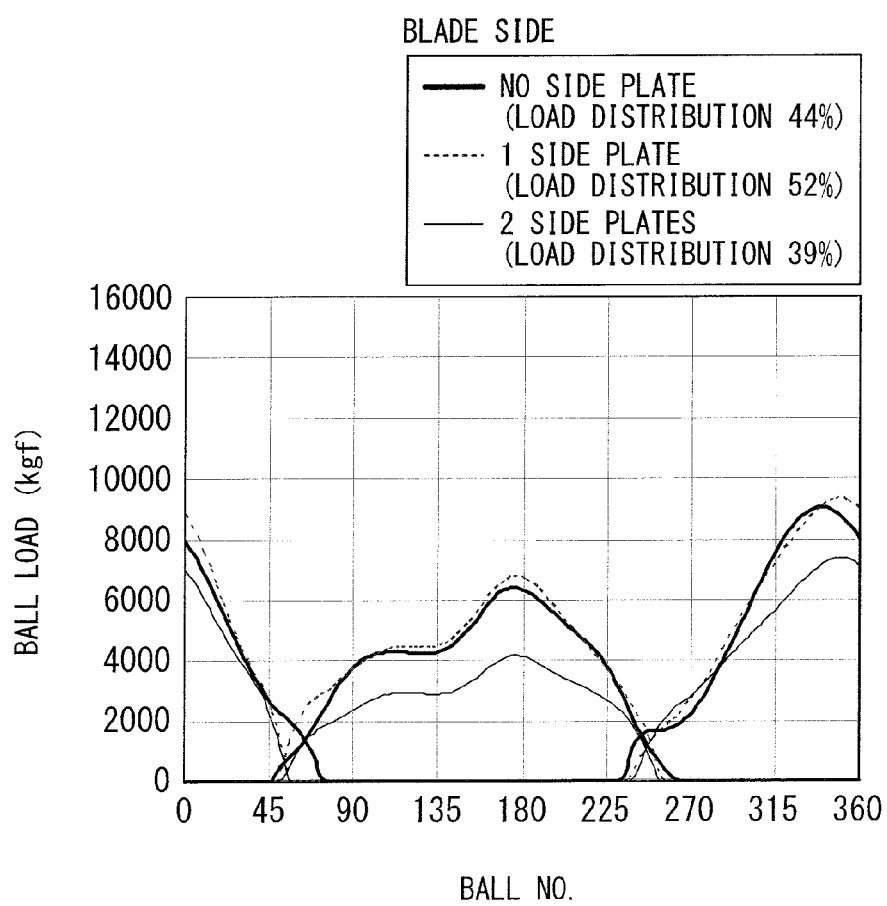
FIG. 16 is a graph showing still another element load distribution in the slewing bearing structure of the wind turbine according to the present invention.
Figure 17:
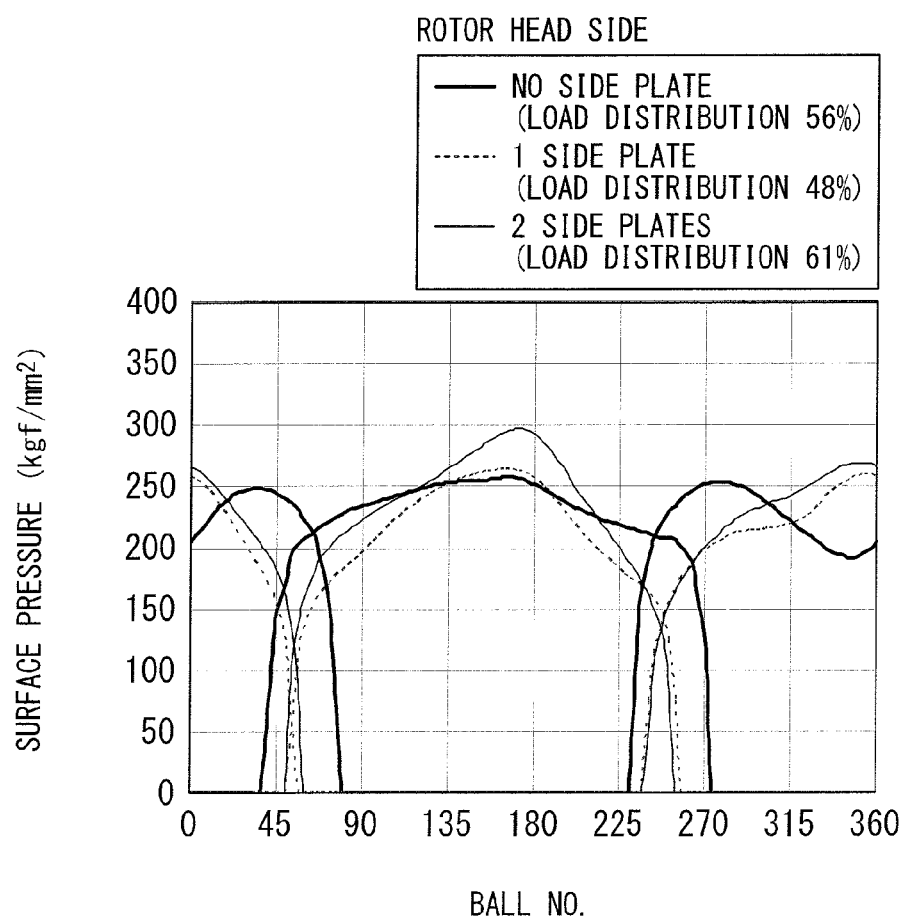
FIG. 17 is a graph showing still another surface pressure distribution in the slewing bearing structure of the wind turbine according to the present invention.

FIGS. 11 to 14 show results of FEM analysis performed on loads distributed through the load distribution described above. Here, a horizontal axis denotes angular coordinate position for one rotation of the inner and outer rings, and is discretized with element numbers. FIG. 11 shows a rolling element load distribution on the rotor head side when the FEM analysis is performed in different distribution ratios of f1 and f2. The rolling element load on the rotor head side is larger than the rolling element load on the blade side. A rolling element load distribution in application of load in the distribution ratio of 50% is controlled smaller on the rotor head side over the entire circumferential ranges than a rolling element load distribution in application of load in the distribution ratio of 59% or 61%. FIG. 13 shows a surface pressure distribution on the rotor head side corresponding to the rolling element load distribution shown in FIG. 11. The surface pressure distribution in application of normal load in the distribution ratio of 50% is controlled smaller on the rotor head side over the entire circumferential ranges than the surface pressure distribution in application of normal load in the distribution ratio of 59% or 61%. In this manner, values of the rolling element load distribution and the surface pressure distribution on a side in which these distributions are large are controlled smaller and values thereof on the side in which these distributions are small are large, thus flattening the both distributions. FIGS. 12 and 14 show that the rolling element load difference distribution and the surface pressure difference distribution in the both rows are flattened, indicating equal, appropriate distribution.

FIGS. 15 to 18 show results of FEM analysis performed when the ring plates (single side plates) 13 and 13' shown in FIG. 10 are added. These figures show that in the distribution ratio of 48% which is close to 50%, the rolling element load difference distribution and the surface pressure difference distribution are generally further flattened on the rotor head side where the ball load and the surface pressure are large.

Second Embodiment

As still another example of unequal load distribution, by using a two-row roller bearing, pre-load with respect to the roller is adjusted, thereby increasing the bearing loading capability, which permits absorption of some load inequality. Integration of a retainer of the first rolling element row 6 and a retainer of the second rolling element row 7 is effective for equalization (flattening) of surface pressure. It is effective to equalize roller load on one circumference. To equalize this roller load, rolling surfaces of both the outer ring 4 and the inner ring 5 can be formed into a non-perfect circle, or either of the outer ring 4 and the inner ring 5 can be formed into a non-perfect circle, and pre-load provided to this roller can be adjusted to thereby equalize (flatten) the bearing surface pressure distribution.

As described above, in the double-row slewing bearing of the present invention, the surface pressure difference distribution can be flattened by flattening the load difference distribution, thus achieving provision of double rows to the slewing bearing and surface pressure equalization thereof at the same time. Consequently, loads for which the outer ring and the inner ring are responsible can be equally distributed in correspondence with the double-row rolling element rows. The equal load distribution is achieved by a high rigidity of the double-row slewing bearing or an equality in the overall rigidity (bearing rigidity+support rigidity) for each rolling element rows.

The invention claimed is:

1. A slewing bearing structure, comprising:
   an outer ring having first and second circumferential outer grooves formed in parallel on an inner circumferential surface of the outer ring;
   an inner ring provided on an inner side of said outer ring and having first and second circumferential inner grooves formed in parallel on an outer circumferential surface of the inner ring in correspondence to said first and second circumferential outer grooves of said outer ring, respectively;
   a first row of rolling elements provided in said first circumferential outer groove of said outer ring and said first circumferential inner groove of said inner ring;
   a second row of rolling elements provided in said the second circumferential outer groove of said outer ring and said second circumferential inner groove of said inner ring; and
   first and second side plates,
   wherein said inner ring is rotatable, via said first and second rows of rolling elements, around a rotation axis and relative to said outer ring,
   wherein said outer ring includes:
      a first outer ring section provided with said first circumferential outer groove; and
      a second outer ring section provided with said second circumferential outer groove,
   wherein said first and second side plates are connected with said first and second outer ring sections, respectively, and
   wherein said first and second side plates provide different rigidities for said first and second outer ring sections.

2. The slewing bearing structure according to claim 1, wherein a width of said outer ring in a direction of the rotation axis is wider than that of said inner ring.

3. The slewing bearing structure according to claim 1, wherein the rolling elements of said first row and said second row are balls.

4. The slewing bearing structure according to claim 1, wherein the rolling elements of said first row and said second row are rollers.

5. A slewing bearing structure, comprising:
   an outer ring having first and second circumferential outer grooves formed in parallel on an inner circumferential surface of the outer ring;
   an inner ring provided on an inner side of said outer ring and having first and second circumferential inner grooves formed in parallel on an outer circumferential surface of the inner ring in correspondence to said first and second circumferential outer grooves of said outer ring, respectively;
   a first row of rolling elements provided in said first circumferential outer groove of said outer ring and said first circumferential inner groove of said inner ring;
   a second row of rolling elements provided in said the second circumferential outer groove of said outer ring and said second circumferential inner groove of said inner ring; and
   first and second side plates,
   wherein said inner ring is rotatable, via said first and second rows of rolling elements, around a rotation axis and relative to said outer ring,
   wherein said inner ring includes:
      a first inner ring section provided with said first circumferential inner groove; and
      a second inner ring section provided with said second circumferential inner groove,
   wherein said first and second side plates are connected with said first and second inner ring sections, respectively, and
   wherein said first and second side plates provide different rigidities for said first and second inner ring sections.

6. A wind turbine power generator, comprising:
   a rotor head connected to a rotary shaft;
   a plurality of blades; and
   slewing bearings connecting said plurality of blades to said rotor head,
   wherein each of said slewing bearings comprises:
   an outer ring having first and second circumferential outer grooves formed in parallel on an inner circumferential surface of the outer ring;
   an inner ring provided on an inner side of said outer ring and having first and second circumferential inner grooves formed in parallel on an outer circumferential surface of the inner ring in correspondence to said first and second circumferential outer grooves of said outer ring, respectively;
   a first row of rolling elements provided in said first circumferential outer groove of said outer ring and said first circumferential inner groove of said inner ring;
   a second row of rolling elements provided in said the second circumferential outer groove of said outer ring and said second circumferential inner groove of said inner ring; and first and second side plates,
wherein said inner ring is rotatable, via said first and second rows of rolling elements, around a rotation axis and relative to said outer ring,
wherein said outer ring includes:
a first outer ring section provided with said first circumferential outer groove; and
a second outer ring section provided with said second circumferential outer groove,
wherein said first and second side plates are connected with said first and second outer ring sections, respectively, and
wherein said first and second side plates provide different rigidities for said first and second outer ring sections.

7. The wind turbine power generator according to claim 6, wherein a width of said outer ring in a direction of the rotation axis is wider than that of said inner ring.

8. The wind turbine power generator according to claim 6, wherein, in each of said slewing bearings, the rolling elements of said first row and said second row are balls.

9. The wind turbine power generator according to claim 6, wherein, in each of said slewing bearings, the rolling elements of said first row and said second row are rollers.

10. A wind turbine power generator, comprising:
a rotor head connected to a rotary shaft;
a plurality of blades; and
slewing bearings connecting said plurality of blades to said rotor head,
wherein each of said slewing bearings comprises:
an outer ring having first and second circumferential outer grooves formed in parallel on an inner circumferential surface of the outer ring;
an inner ring provided on an inner side of said outer ring and having first and second circumferential inner grooves formed in parallel on an outer circumferential surface of the inner ring in correspondence to said first and second circumferential outer grooves of said outer ring, respectively;
a first row of rolling elements provided in said first circumferential outer groove of said outer ring and said first circumferential inner groove of said inner ring;
a second row of rolling elements provided in said the second circumferential outer groove of said outer ring and said second circumferential inner groove of said inner ring; and
first and second side plates,
wherein said inner ring is rotatable, via said first and second rows of rolling elements, around a rotation axis and relative to said outer ring,
wherein said inner ring includes:
a first inner ring section provided with said first circumferential inner groove; and
a second inner ring section provided with said second circumferential inner groove,
wherein said first and second side plates are connected with said first and second inner ring sections, respectively, and
wherein said first and second side plates provide different rigidities for said first and second inner ring sections.

11. A slewing bearing structure, comprising:
an outer ring having first and second circumferential outer grooves formed in parallel on an inner circumferential surface of the outer ring;
an inner ring provided on an inner side of said outer ring and having first and second circumferential inner grooves formed in parallel on an outer circumferential surface of the inner ring in correspondence to said first and second circumferential outer grooves of said outer ring, respectively;
a first row of rolling elements provided in said first circumferential outer groove of said outer ring and said first circumferential inner groove of said inner ring;
a second row of rolling elements provided in said the second circumferential outer groove of said outer ring and said second circumferential inner groove of said inner ring; and
first and second side plates,
wherein said inner ring is rotatable, via said first and second rows of rolling elements, around a rotation axis and relative to said outer ring,
wherein a width of said outer ring in a direction of the rotation axis is wider than that of said inner ring,
wherein the first side plate is coupled to a surface of said outer ring orthogonal to the rotation axis, and
the second side plate is coupled to a surface of said inner ring orthogonal to the rotation axis.

* * * * *